Feb. 16, 1943. E. I. MATTHEWS ET AL 2,311,118
CIRCUIT CONTROL SYSTEM
Filed July 10, 1940

WITNESS:
Rob R Mitchell

INVENTORS
Edward I. Matthews,
Arthur C. Cherksey and
Abraham Scheinfeld
BY
Burns + Harding
ATTORNEYS.

Patented Feb. 16, 1943

2,311,118

UNITED STATES PATENT OFFICE 2,311,118

CIRCUIT CONTROL SYSTEM

Edward I. Matthews, Arthur C. Cherksey, and Abraham Scheinfeld, Philadelphia, Pa., assignors to Electric Heating Equipment Company, Philadelphia, Pa., a corporation of Delaware Application July 10, 1940, Serial No. 344,698

2 Claims. (Cl. 171—242)

This invention is directed to an improved temperature control system, more particularly one for use with electrically heated vapor boilers.

Heretofore it has been proposed to control the temperature obtaining in electric furnaces and other electrically heated equipment by interposing, in series with the resistance elements used to provide the heat, a so-called "saturable reactor," a device the A.-C. impedance of which can be varied by the amount of D.-C. current passing through a D.-C., or saturating, winding. Thus, by automatically varying the D.-C. saturating current in accordance with the temperature obtaining in the furnace, the A.-C. voltage across the resistors, and hence the energy converted into heat, could be varied so as to maintain a uniform temperature.

Automatic variation of the D.-C. saturating current was effected by providing for the change of position of a potentiometer slider in accordance with changes in the voltage developed by a thermocouple located in the zone to be kept at uniform temperature, and having this change in the setting of the potentiometer vary the grid potential of a grid-controlled gas-filled tube through which the D.-C. saturating current passed.

While this system was superior to earlier systems involving "on-off" control, nevertheless it lacked the extreme accuracy and closeness of control required in many installations.

Now we have found in accordance with this invention that, surprisingly, by utilizing a different method of actuating the potentiometer slider, namely, by actuating it in response to pressure variations within the electrically heated vapor boiler which it is desired to control, the accuracy and delicacy of the control system is greatly enhanced and that, if desired, a simpler and less cumbersome control system can be used than that heretofore used, since, in accordance with my invention, it is possible, even with a comparatively simple control system such as that hereinafter described, to obtain a greater accuracy and precision in the closeness of control than that heretofore obtainable even with more complicated systems.

Thus, in accordance with our invention temperature control within a range of ±¼° F. can be obtained with temperatures ranging from 100 to 1200° F., and under load conditions varying during operation from a fraction of 1 kva. to 10,000 kva. or higher.

Such control is accomplished, in accordance with our invention, by providing for movement of the slider of the controlling potentiometer in the control circuit in response to variations in fluid pressure developed in the vapor boiler. The actuation of the potentiometer slider in accordance with our invention may either be directly by the vapor of the material in the boiler or indirectly by means responsive to variations in the pressure of such vapor.

In the drawing which accompanies this specification and forms a part thereof:

Figure 1 is a considerably simplified wiring diagram of the temperature control circuit. As shown in this figure, the load I it connected across an alternating current power supply in series with the saturable reactor 3.

Figure 3:
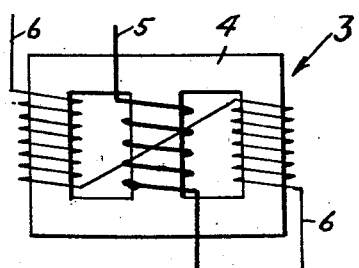
Figure 3 is a detail view, somewhat diagrammatic, of the saturable reactor employed in the control circuit.

The saturable reactor 3 comprises, as shown in Fig. 3, an iron core 4 provided with an A.-C. winding 5 and a D.-C. winding 6. When no current is flowing in the D.-C. winding 6, the impedance to the flow of current in the A.-C. winding 5 is high and the voltage across the load I is correspondingly low. With maximum D.-C. current flowing in the winding 6, the iron core 4 becomes saturated and thus affords substantially no impedance to the flow of A.-C. current in the winding 5. The voltage across the load I is then correspondingly high. With intermediate values of D.-C. current in the winding 6, the impedance of the reactor 3 varies between maximum and minimum, and thus affords a nice control of the voltage across the load I.

Current for the D.-C. winding of the saturable reactor is furnished from a suitable source, as a rectifier, and its value is controlled by the position of the variable resistance or rheostat 7, in series with the winding 6. Rheostat 7 is motor-driven from a reversible electric motor 9 through suitable reduction gearing, in well-known manner.

The operation of the motor 9 is determined by the position of relay 13. This relay will be held in open, or neutral position, and the motor 9 deenergized, as long as the voltage impressed across the coils 15 and 17, respectively, of the relay is the same. As soon as the voltage impressed across one of the coils 15, 17 is greater than that impressed across the other, the relay will be unbalanced and arm 19 will make contact with either contact 21 or 23, energizing, from transformer 25, the motor 9 in one or the other direction.

Coils 15, 17 form, with potentiometer 27, resistances 29 and 31, and potentiometer 33, a Wheatstone bridge circuit, in which the coils are in opposite legs, so that the coils 15, 17 have the same voltage impressed across them only when the bridge circuit is balanced.

Potentiometer 27, as hereinafter set forth, may be directly operated by pressure developed in the vapor boiler heated by the load 1. Potentiometer 33 is connected directly to the shaft driving rheostat 7 and is driven thereby at the same rate as rheostat 7. Rheostats 29 and 31 are motor driven through reduction gearing by a second reversible electric motor 35. This motor is energized, through relay 39, whenever potentiometer 27 is unbalanced to any substantial extent. Thus, when contact 49 is closed both rheostats 29 and 31 are rotated clockwise, increasing the resistance in 29 and decreasing that in 31; while when contact 45 is closed the rotation is counter-clockwise. Limit switches are provided to deenergize the respective coils when the rheostat arms have reached the limit of their travel in either direction.

Figure 2:
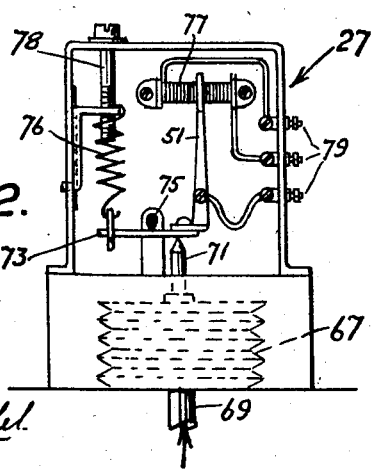
Figure 2 is a detail view showing a pressure-operated slide-wire potentiometer used in accordance with this invention.

The controlling potentiometer 27 is responsive to variations in pressure (as vapor pressure) within the controlled boiler. An instrument suitable for this purpose is shown in Fig. 2. The instrument comprises a bellows 67 connected to conduit 69 through which the effect of variations in pressure within the controlled boiler is transmitted to the bellows. A pin 71 extending from the upper end of the bellows 67 bears against the under side of a plate 73 which is held against pivots 75 by a spring 76, the tension of which may be adjusted by the screw 78. The slider arm 51 is secured to the plate 73 and contacts the potentiometer coil 77, as shown in the drawing. Electrical connections are made through the binding posts 79.

It is apparent that an increase in fluid pressure transmitted through conduit 69 will cause the bellows 67 to expand. The pin 71 will thereby be raised, tilting the plate 73 about the pivot 75 against the action of the spring 76 and causing the potentiometer slider 51 to move to the left across the coil 77.

Figure 1:
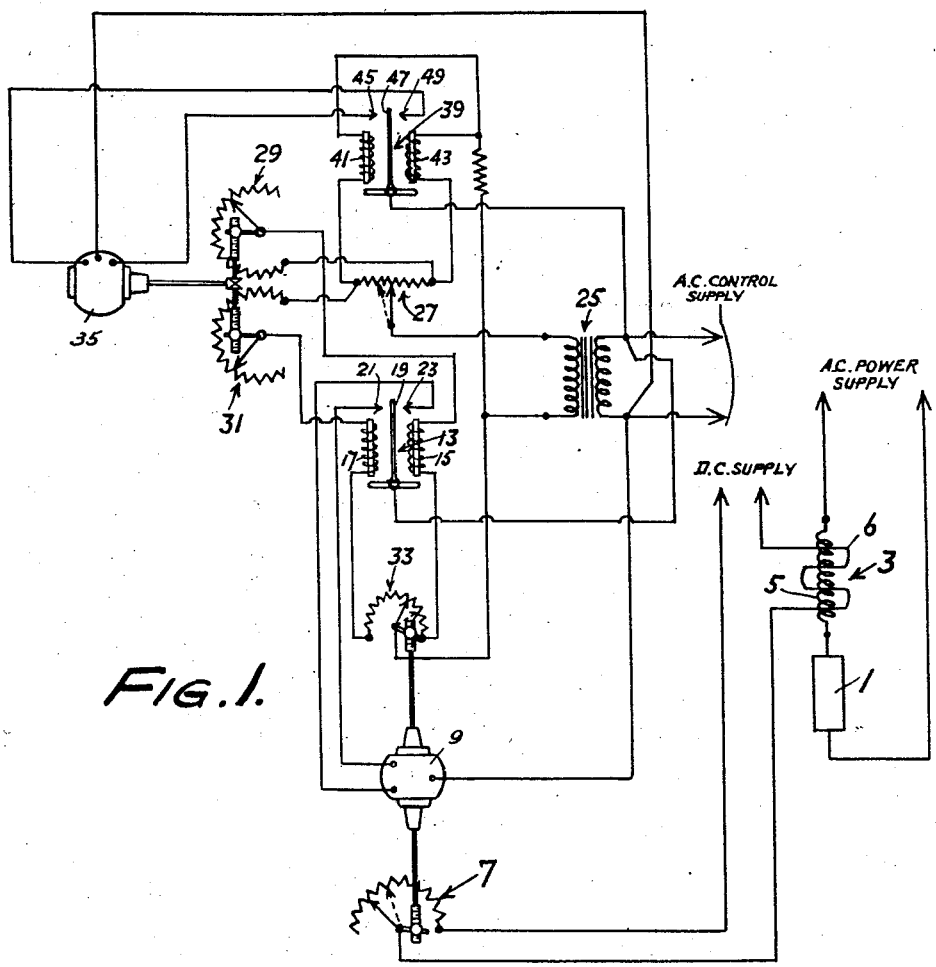
Figure 1 is a simplified diagrammatic view of the control circuit.

The operation of the control circuit is as follows. Suppose that the circuits are balanced with the sliders in potentiometers 27 and 33 and rheostat 7 as shown in the full lines in Fig. 1, and that there is a rise in the load requirements of the controlled boiler such that the pressure in the boiler drops slightly. This drop in pressure will be communicated to the bellows 67 through conduit 69 and the bellows will contract slightly, lowering pin 71 and permitting the potentiometer slider 51 to move under the influence of spring 76 across the potentiometer coil 77. This movement of potentiometer 27 is shown (exaggerated in degree) by the dotted position of the potentiometer slider in Fig. 1.

The change in the setting of potentiometer 27 will unbalance the bridge circuit so that the voltage in the leg including coil 17 of the relay 13 is greater than that in the leg including coil 15. Relay 13 will consequently be energized to close the motor circuit through contact 23, energizing the motor 9 driving rheostat 7 and so rotating the rheostat slider in a clockwise direction. At the same time the slider of balancing potentiometer 33, driven by the same motor, is rotated in a clockwise direction, and accordingly the bridge circuit will be rebalanced and relay 13 opened when the sliders of rheostat 7 and potentiometer 33, respectively, have moved to the position shown by the dotted lines in Fig. 1.

The movement of rheostat 7 shown will reduce the resistance in series with the D.—C. winding of the saturable reactor 3, thereby increasing the saturating current and so decreasing the A.—C. impedance and raising the power input to the boiler to meet the increased load requirements.

In a similar manner a decrease in the load requirements of the boiler will cause such a change in the setting of potentiometer 27 as will energize relay 13 to close the motor circuit through contact 21, energizing the motor 9 to drive rheostat 7 (and balancing potentiometer 33) counter-clockwise, thus effecting a decrease in the power input to the boiler.

It will be noted that in the operation described above the bridge circuit becomes rebalanced with the slider of potentiometer 27 off the neutral or mid-point of the potentiometer coil. Accordingly if the increase or decrease in load requirement is a relatively permanent one, the system is reestablished at a pressure in the vapor boiler somewhat above or below that for which the controls were originally set. To correct this and bring the boiler pressure, at any load, back to the desired value for which the controls were set, the following operation occurs.

If the movement of the potentiometer slider in control potentiometer 27 from its mid-point, or neutral position, in response to pressure variations in the controlled boiler, is at all substantial, relay 39 will be unbalanced and the motor 35 driving rheostats 29 and 31 will be energized. Thus, the movement of the potentiometer slider of potentiometer 27 shown by the dotted lines in Fig. 1 will cause relay 39 to close the motor circuit through contact 49, energizing motor 35 and rotating both rheostat sliders in a clockwise direction. This increases the resistance in one leg of the bridge circuit (that including coil 15) and decreases it in the other leg (that including coil 17), thus unbalancing the bridge circuit and actuating relay 13 to energize the motor 9 through contact 23 and drive rheostat 7 clockwise to raise the power input to the boiler.

The motor 35 driving rheostats 29 and 31 will continue to operate until the boiler pressure returns to the desired value, thus bringing the slider of potentiometer 27 to its midpoint, or the limit of motion of the rheostats is reached.

In this way close and accurate control of the boiler over an extremely wide range of operating conditions and loads is obtained, since the control circuit insures that equilibrium conditions obtain only when the slider of potentiometer 27 is in its neutral position, and hence the pressure in the boiler is at the predetermined point corresponding thereto.

It will be appreciated that the foregoing description is merely illustrative, and that various details, as the manner in which potentiometer 27 is made responsive to the pressure within the controlled boiler, etc., may be varied without departing from the scope of our invention.

What we claim and desire to protect by Letters Patent is:

1. In a control system for an electric circuit of the character described, in combination, means for varying the operating condition of said circuit, a reversible electric motor for actuating said means, a relay provided with a pair of opposed actuating coils and adapted to control energization of said motor selectively in forward or reverse movement, a Wheatstone bridge circuit including said relay coils in opposite legs thereof and also including a control potentiometer responsive to change in the system being controlled, a variable resistance in said bridge circuit, a second reversible electric motor for actuating said last named resistance to unbalance said bridge circuit, a second relay adapted to control energization of said second motor selectively in forward or reverse movement, and means including the above mentioned potentiometer for controlling the actuation of said second relay.

2. In a control system for an electric circuit of the character described, in combination, means for varying the operating condition of said circuit, a reversible electric motor for actuating said means, a relay provided with a pair of opposed actuating coils and adapted to control energization of said motor selectively in forward or reverse movement, a Wheatstone bridge circuit including said relay coils in opposite legs thereof and also including a control potentiometer responsive to change in the system being controlled, a pair of resistances in opposite legs of said bridge circuit, a second reversible electric motor for actuating said last-named resistances to unbalance said bridge circuit, a second relay adapted to control energization of said second motor selectively in forward or reverse movement, and means including the above mentioned potentiometer for controlling the actuation of said second relay.

EDWARD I. MATTHEWS.
ARTHUR C. CHERKSEY.
ABRAHAM SCHEINFELD.